United States Patent
Miyamoto et al.

(10) Patent No.: US 9,843,387 B2
(45) Date of Patent: Dec. 12, 2017

(54) DECODING APPARATUS, DECODING METHOD, AND NON-TRANSITORY RECORDING MEDIUM

(71) Applicant: CASIO COMPUTER CO., LTD., Tokyo (JP)

(72) Inventors: Naotomo Miyamoto, Tokyo (JP); Hideaki Oshima, Tachikawa (JP)

(73) Assignee: CASIO COMPUTER CO., LTD. (JP)

( * ) Notice: Subject to any disclaimer, the term of this patent is extended or adjusted under 35 U.S.C. 154(b) by 7 days.

(21) Appl. No.: 15/010,454

(22) Filed: Jan. 29, 2016

(65) Prior Publication Data
US 2016/0277108 A1    Sep. 22, 2016

(30) Foreign Application Priority Data

Mar. 20, 2015 (JP) ................................. 2015-058076

(51) Int. Cl.
| | |
|---|---|
| *H04B 10/116* | (2013.01) |
| *H04N 19/46* | (2014.01) |
| *H04N 19/44* | (2014.01) |
| *H04N 9/80* | (2006.01) |

(52) U.S. Cl.
CPC ............. *H04B 10/116* (2013.01); *H04N 9/80* (2013.01); *H04N 19/44* (2014.11); *H04N 19/46* (2014.11)

(58) Field of Classification Search
CPC .............................. H04B 10/116; H04N 19/46
See application file for complete search history.

(56) References Cited

U.S. PATENT DOCUMENTS

| | | | |
|---|---|---|---|
| 2011/0052214 A1* | 3/2011 | Shimada | H04B 10/1141 398/202 |
| 2012/0275516 A1* | 11/2012 | Tanaka | H04N 19/50 375/240.12 |
| 2014/0079122 A1* | 3/2014 | Kondow | H04N 19/176 375/240.12 |
| 2015/0016551 A1* | 1/2015 | Esenlik | H04N 19/117 375/240.29 |

FOREIGN PATENT DOCUMENTS

JP        2015-15693 A        1/2015

* cited by examiner

*Primary Examiner* — Dzung Tran
(74) *Attorney, Agent, or Firm* — Fitch Even Tabin & Flannery LLP

(57) ABSTRACT

When necessary process times in a reception apparatus for a determination on a change area, a determination on the color of the change area, and a decoding of bit data stream exceed a predetermined time from a frame acquiring timing, and a process delay would occur, an image generator acquires a frame. In addition, a decoder temporarily stores the frame in a memory, and thereafter at a predetermined timing performs the determination on the change area, the determination on the color of the change area, and the decoding of the bit data stream.

10 Claims, 6 Drawing Sheets

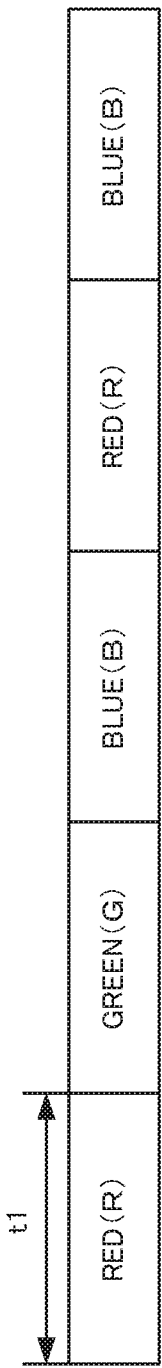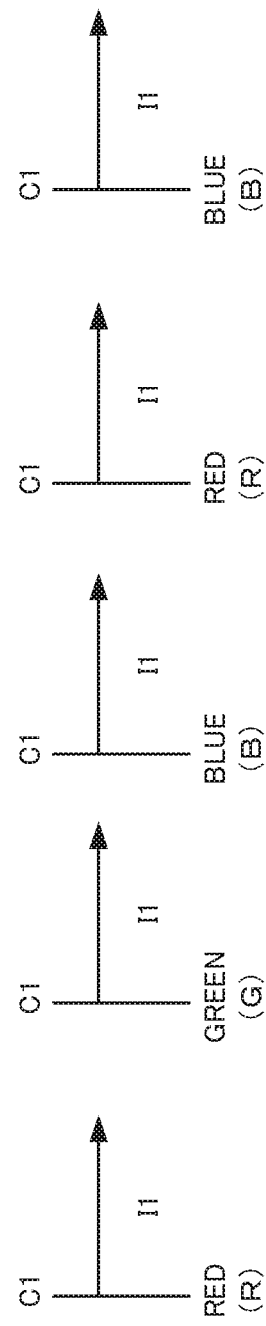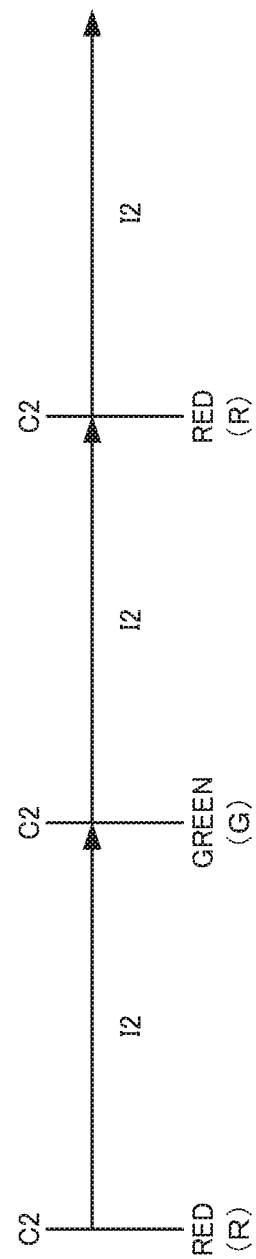

DECODING APPARATUS, DECODING METHOD, AND NON-TRANSITORY RECORDING MEDIUM

CROSS-REFERENCE TO RELATED APPLICATION

This application claims the benefit of Japanese Patent Application No. 2015-058076, filed on Mar. 20, 2015, the entire disclosure of which is incorporated by reference herein.

FIELD

This application relates generally to a decoding apparatus, a decoding method, and a non-transitory recording medium.

BACKGROUND

As disclosed in Unexamined Japanese Patent Application Kokai Publication No. 2015-15693, conventionally, a technology of utilizing the camera device on a mobile phone to scan a change in brightness of optical signals transmitted by a visible light communication, and decoding such optical signals to information has been known.

SUMMARY

A decoding apparatus according to an aspect of the present disclosure includes:
  an acquiring unit configured to continuously acquire images that contain visible lights changing in time-series;
  a first decoding unit configured to sequentially decode information from the visible lights contained in the images continuously acquired by the acquiring unit;
  a record controlling unit configured to continuously record, in a memory, the images acquired by the acquiring unit based on an acquiring speed of the acquiring unit or a process speed by the first decoding unit, and
  a second decoding unit configured to sequentially decode the information from the visible lights contained in the images recorded in the memory.

A decoding method according to a second aspect of the present disclosure includes:
  an acquiring step of continuously acquiring images that contain visible lights changing in time-series;
  a first decoding step of sequentially decoding information from the visible lights contained in the images continuously acquired in the acquiring step; and
  a record controlling step of continuously recording, in a memory, the images acquired in the acquiring step based on an acquiring speed of the acquiring step or a process speed by the first decoding step; and
  a second decoding step of sequentially decoding the information from the visible lights contained in the images recorded in the record controlling step.

A non-transitory computer readable recording medium according to the other aspect of the present disclosure has stored therein a program that causes a computer to function as:
  an acquiring unit configured to continuously acquire images that contain visible lights changing in time-series;
  a first decoding unit configured to sequentially decode information from the visible lights contained in the images continuously acquired by the acquiring unit; and
  a record controlling unit configured to continuously record, in a memory, the images acquired by the acquiring unit based on an acquiring speed of the acquiring unit or a process speed by the decoding unit; and
  a second decoding unit configured to sequentially decode the information from the visible lights contained in the images recorded in the memory.

BRIEF DESCRIPTION OF THE DRAWINGS

A more complete understanding of this application can be obtained when the following detailed description is considered in conjunction with the following drawings, in which:

FIGS. 4A to 4C are each a timing chart for a process executed by a conventional reception apparatus;

DETAILED DESCRIPTION

Figure 1:
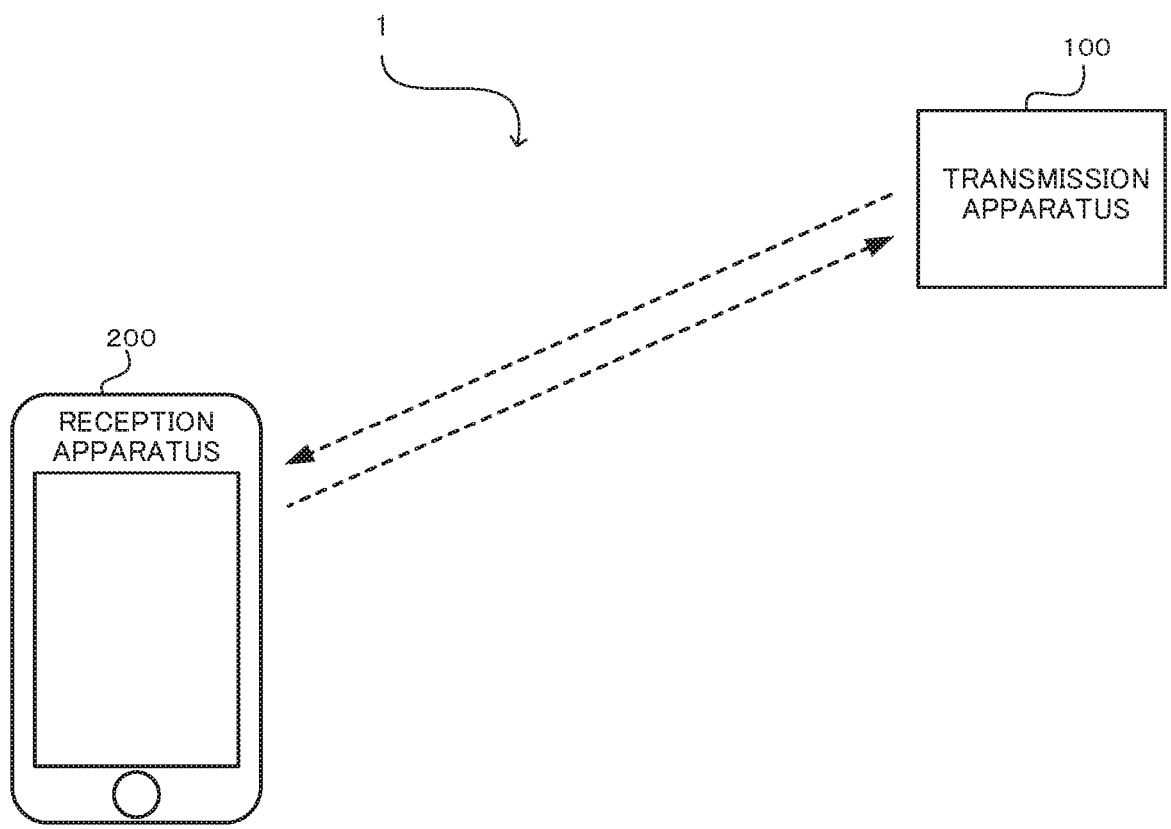
FIG. 1 is a diagram illustrating a structure of an optical communication system according to an embodiment of the present disclosure.

An explanation will be given below of an optical communication system according to an embodiment of the present disclosure. As illustrated in FIG. 1, the optical communication system 1 according to an embodiment of the present disclosure includes a transmission apparatus 100, and a reception apparatus 200.

According to the optical communication system 1, the transmission apparatus 100 and the reception apparatus 200 are capable of communicating from the transmission apparatus 100 to the reception apparatus 200 by a communication medium that is visible light.

The transmission apparatus 100 converts, by modulation, communication-target information to be transmitted to the reception apparatus 200 into optical signals with a predetermined wavelength which are Red (R), Green (G), and Blue (B) lights and which are visible lights changing in time-series, and repeatedly outputs such optical signals.

The reception apparatus 200 is, for example, a smartphone, and receives optical signals from the transmission apparatus 100 by imaging the transmission apparatus 100 that is present within an imaging range. In addition, the reception apparatus 200 displays an image obtained by image pickup. Still further, the reception apparatus 200 decodes the communication-target information from the received optical signals, and displays the decoded information.

Figure 2:
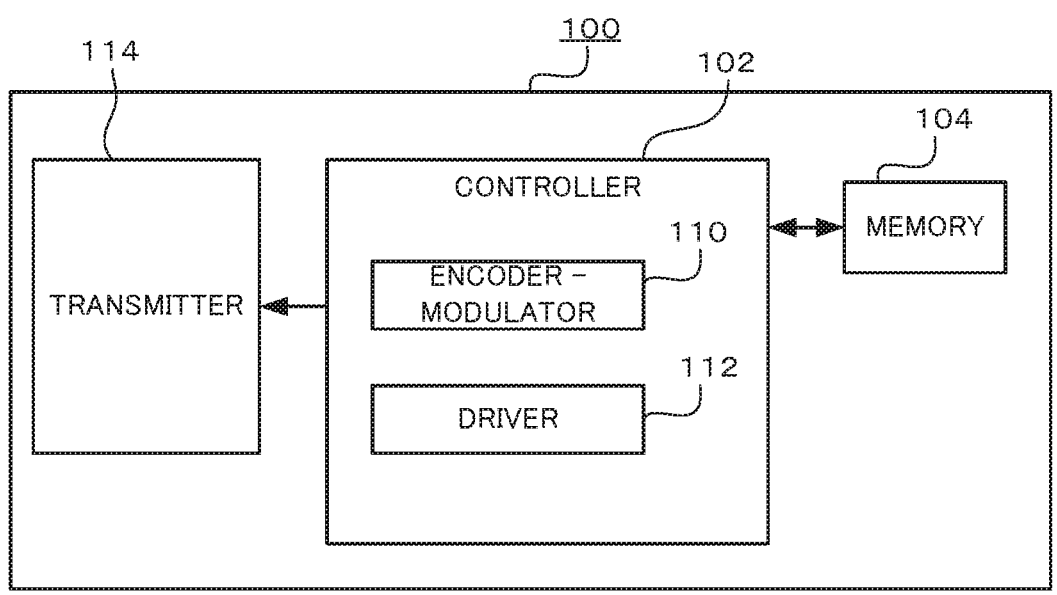
FIG. 2 is a diagram illustrating a structure of a transmission apparatus illustrated in FIG. 1.

Next, an explanation will be given of the transmission apparatus 100. As illustrated in FIG. 2, the transmission apparatus 100 includes a controller 102, a memory 104, and a transmitter 114.

The controller 102 includes a Central Processing Unit (CPU), executes a software process in accordance with a program stored in the memory 104, and functions so as to realize various functions of the transmission apparatus 100.

The memory 104 includes, for example, a Random Access Memory (RAM) serving as a work area, and a Read Only Memory (ROM) that stores a basic operation program. The memory 104 stores various pieces of information (for example, programs) utilized to, for example, control the transmission apparatus 100.

An encoder-modulator 110 in the controller 102 encodes the communication-target information in a bit data stream. In addition, the encoder-modulator 110 performs a digital modulation based on the bit data stream. An example modulation scheme applicable is 4 Pulse Position Modulation (4PPM) that utilizes a carrier wave with a frequency of 28.8 (kHz). A driver 112 in the controller 110 controls the transmitter 114 to change visible lights with different wavelengths which are red (R), green (G), and blue (B) lights which are visible lights in terms of time that is a change cycle of t1 at the same brightness based on the signals generated by the encoder-modulator 110.

The transmitter 114 includes, for example, Light Emitting Diodes (LEDs), and under the control of the driver 112, outputs lights with respective wavelengths which are red (R), green (G), and blue (B) so as to change in terms of time that is the change cycle of t1 at the same brightness.

Figure 3:
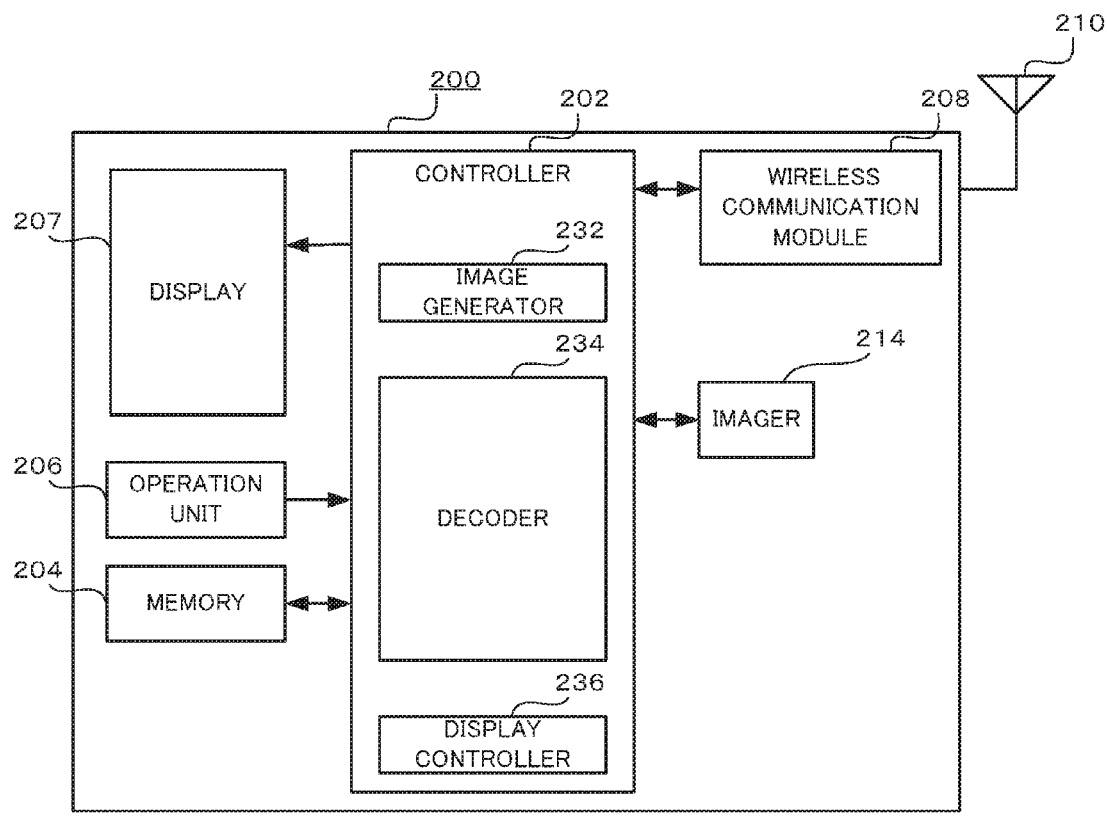
FIG. 3 is a diagram illustrating a structure of a reception apparatus illustrated in FIG. 1.

Next, an explanation will be given of the reception apparatus 200. The reception apparatus 200 functions as a communication apparatus which displays a picked-up image, and which receives information from the transmission apparatus 100. As illustrated in FIG. 3, the reception apparatus 200 includes a controller 202, a memory 204, an operation unit 206, a display 207, a wireless communication module 208, an antenna 210, and an imager 214.

The controller 202 is realized by a CPU. The controller 202 executes a software process in accordance with a program stored in the memory 204, thereby realizing various functions of the reception apparatus 200.

The memory 204 includes, for example, a RAM and a ROM. The memory 204 stores various pieces of information (for example, programs).

The operation unit 206 includes a touch panel disposed on the top surface of a display area of the display 207, and is also an interface utilized by a user to input operation details. The display 207 includes, for example, a Liquid Crystal Display (LCD), a Plasma Display Panel (PDP), or an Electro-Luminescence (EL) display, and displays an image.

The wireless communication module 208 includes, for example, a wireless frequency (Radio Frequency: RF) circuit or a Base Band (BB) circuit. The wireless communication module 208 transmits and receives wireless signals via the antenna 210. In addition, the wireless communication module 208 performs modulation on a transmission signal and also demodulation on a reception signal.

The imager 214 is disposed on an opposite surface to a surface on which the display 207 is installed in a casing of the reception apparatus 200. The imager 214 includes a lens and photosensitive elements. The lens includes, for example, a zoom lens, and is actuated by the zoom control and focusing control by the controller 202. The field angle of the imager 214, and an optical image are controlled by the actuation of the lens. The photosensitive elements include a plurality of photosensitive elements arranged regularly and two-dimensionally on a photosensitive surface. The photosensitive elements are imaging devices, such as a photo diode, a Charge Coupled Device (CCD) built with color filters in a manner of Bayer arrangement or a three CCD type, or a Complementary Metal Oxide Semiconductor (CMOS).

The imager 214 picks up an image at an imaging cycle t1 that is consistent with the change cycle t1 of light by the transmitter 114 in the transmission apparatus 100. The imager 214 picks up (receives light) an image of an incident optical image at a field angle within a predetermined range based on control signals from the controller 202, and sequentially outputs image signals within that field angle to the controller 202.

An image generator 232 in the controller 202 converts an image signal into digital data every time such an image signal is input from the imager 214, thereby creating (acquiring) a frame. A display controller 236 in the controller 202 controls the display 207 to display thereon an image corresponding to the frame.

A decoder 234 in the controller 202 scans frames input in sequence in time-series, and determines a location (change area) where a hue changes originating from a change in wavelength in the frame. More specifically, the decoder 234 determines a luminosity of each pixel within the image data of the frame. Next, the decoder 234 determines that pixels with a luminosity that is equal to or higher than a predetermined value as a candidate (candidate area) of the location (change area) where the hue changes by receiving wavelength light corresponding to a luminescent color from the transmitter 114 in the transmission apparatus 100. Still further, the decoder 234 determines the hue at the same coordinate in the candidate area for each of the predetermined number of frames acquired recently. The result of determination, when a hue value changes largely at a predetermined pattern, such that the hue value at a coordinate within the candidate area is a first predetermined value in a given frame, but becomes a second predetermined value in another frame, the decoder 234 determines that this candidate area is the change area.

When the change area is present, the decoder 234 subsequently acquires the hue value (type of wavelength) of the change area within the frame for each image pickup, and determines the color of the change area which is any of red (R), green (G), and blue (B) corresponding to the hue value. Next, the decoder 234 decodes a bit data stream corresponding to each color that is red (R), green (G), or blue (B), and acquires the communication target information. Still further, the display controller 236 controls the display 207 to display an image represented by the communication-target information.

Meanwhile, depending on the performance of a device in the reception apparatus 200, necessary process times for the acquisition of the frame, the determination on the change area, the determination on the color of the change area, and the decoding of the bit data stream may exceed the light change cycle and the imaging cycle which are t1, and thus a process delay would occur.

FIGS. 4A to 4C are each a timing chart for a process by a conventional reception apparatus. As illustrated in FIG. 4A, an example case in which red (R), green (G), and blue (B) lights with respective wavelengths are output by the transmission apparatus in a manner changing in terms of time that is the change cycle t1 will be examined. In this case, as illustrated in FIG. 4B, necessary process times I1 which are for the determination on the change area, the determination on the color of the change area, and the decoding of the bit data stream, and which start from an acquisition timing C1 of a frame in the reception apparatus are within a time t1. Hence, no process delay occurs in the reception apparatus, and thus the communication-target information is acquired accurately.

Conversely, in FIG. 4C, necessary process times I2 which are for the determination on the change area, the determination on the color of the change area, and the decoding of the bit data stream, and which start from an acquisition timing C2 of a frame in the reception apparatus exceed the time t1. Hence, a process delay occurs in the reception apparatus, a part of bit data stream is lost, and thus communication-target information is not acquired accurately.

Therefore, according to this embodiment, when an occurrence of a process delay in the reception apparatus 200 is expectable, the image generator 232 acquires a frame. In addition, the decoder 234 temporarily stores such a frame in the memory 204, and then executes respective processes, such as the determination on the change area, the determination on the color of the change area, and the decoding of the bit data stream, at subsequent predetermined timings.

More specifically, first of all, the decoder 234 determines (device determination) whether or not a process delay would occur in the reception apparatus 200. The decoder 234 is capable of determining whether or not a process delay would occur based on, for example, the process speed of the CPU that constructs the controller 102, and the resolution of the frame which are known beforehand. In addition, the decoder 234 may execute a program for a process delay determination, and measure and compare process times for sample frames, thereby determining whether or not a process delay would occur based on the results. In addition, the transmission apparatus 100 outputs red (R), green (G), and blue (B) lights with respective wavelengths at the change cycle t1, but has, as a header at a cycle t2 longer than the cycle t1, a time period at which no light is emitted. In this case, the decoder 234 determines the change area, and when capable of determining the absence of light emission at the cycle t2, the decoder 234 determines that a process delay would not occur. When the decoder 234 determines the change area but unable to determine the absence of light emission at the cycle t2, the decoder 234 determines that a process delay would occur.

Figure 5A:
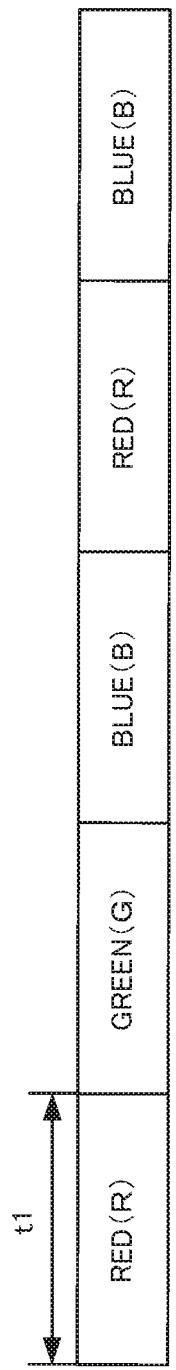
FIGS. 5A and 5B are each a timing chart for a process executed by the reception apparatus according to the embodiment of the present disclosure.
Figure 5B:
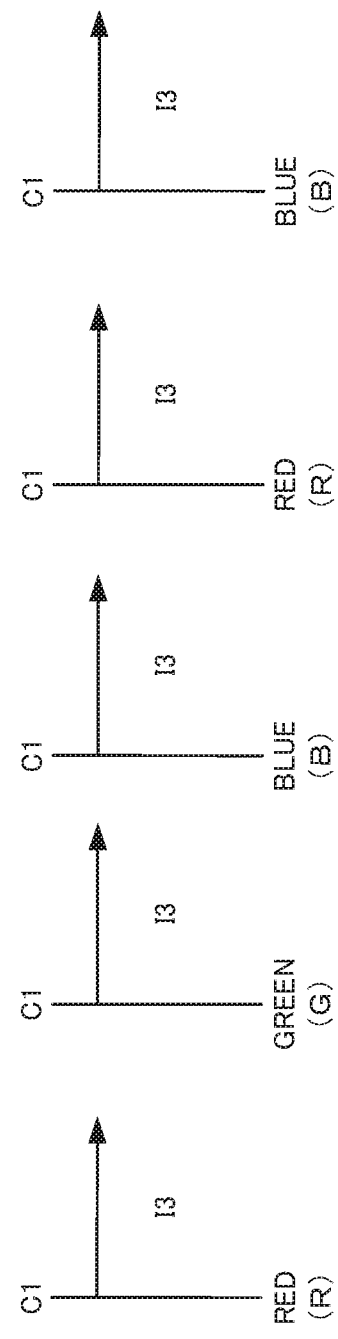

The result of device determination, when a process delay would occur, the following processes are executed. FIGS. 5A and 5B are each a timing chart for a process executed by the reception apparatus 200. As illustrated in FIG. 5A, an example case in which red (R), green (G), and blue (B) lights with respective wavelengths are output by the transmission apparatus in a manner changing in terms of time that is the change cycle t1 will be examined. In this case, when necessary process times I3 for the acquisition of a frame, the determination on the change area, the determination on the color of the change area, and the decoding of the bit data stream exceed the time t1, a process delay would occur. Hence, as illustrated in FIG. 5B, the image generator 232 generates (acquires) a frame in a real-time manner every time an image signal from the imager 214 is input, and the decoder 234 temporarily stores this frame in the memory 204. Subsequently, the decoder 234 performs the determination on the change area, the determination on the color of the change area, and the decoding of bit data stream at predetermined timings (for example, after the completion of a reception process).

Next, an explanation will be given of an operation of the optical communication system 1. According to the optical communication system 1, the transmission apparatus 100 executes a transmission process, while the reception apparatus 200 executes a reception process.

The encoder-modulator 110 in the controller 102 of the transmission apparatus 100 encodes the communication-target information to a bit data stream, and further performs a digital modulation based on this bit data stream.

Next, the driver 112 in the controller 102 controls the transmitter 114 to change red (R), green (G), and blue (B) lights in terms of time that is the light emission cycle t1 based on the signal generated by the encoder-modulator 110. Hence, under the control of the driver 112, the transmitter 114 outputs the red (R), green (G), and blue (B) lights at the light emission cycle t1 and at the same brightness based on the modulated communication-target information.

Figure 6:
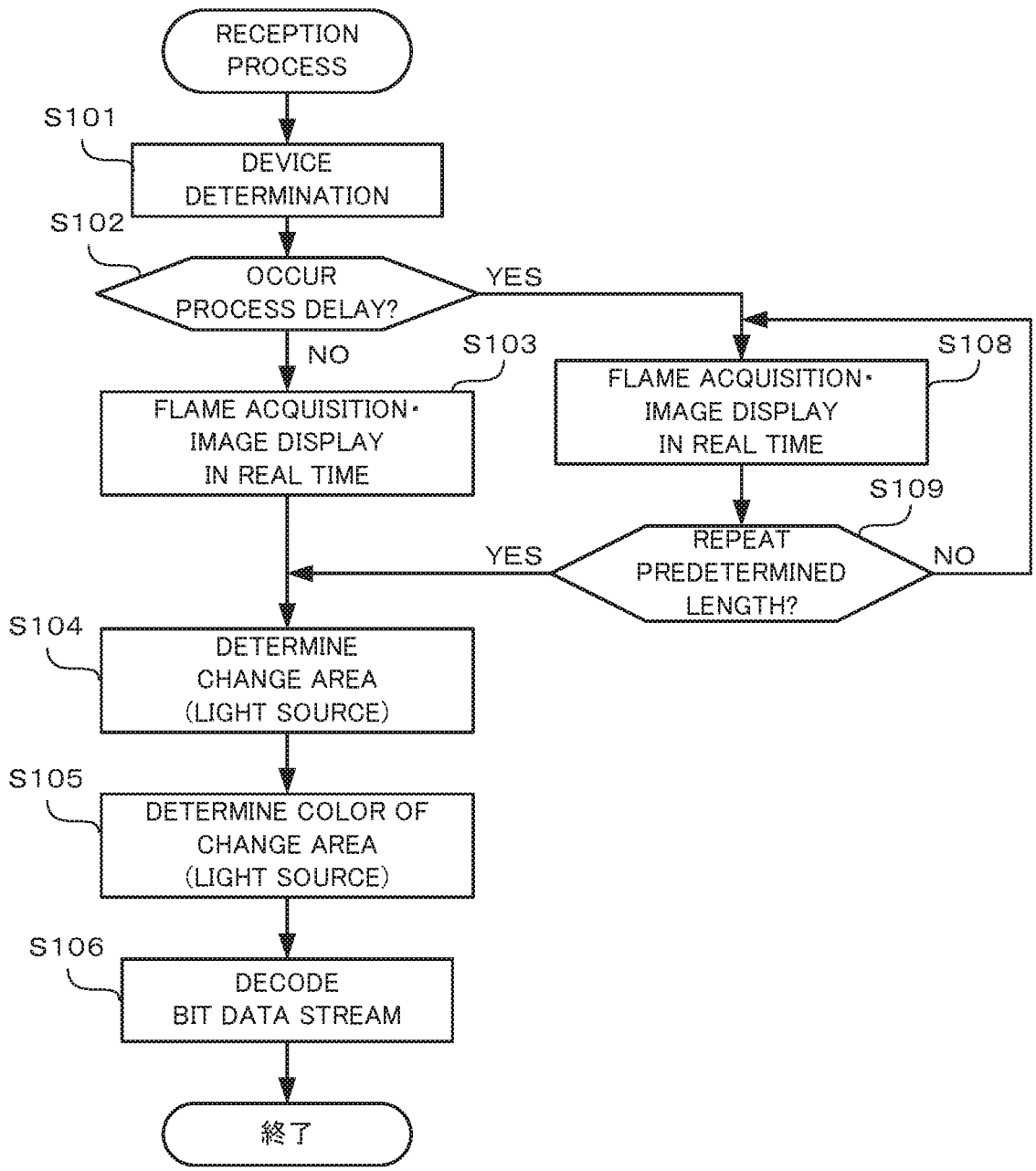
FIG. 6 is a flowchart illustrating an operation of the reception apparatus in a reception process.

FIG. 6 is a flowchart illustrating an operation of the reception apparatus 200 in the reception process. First, the decoder 234 in the controller 202 executes the device determination (step S101), and determines, based on the result of the device determination, whether or not a process delay would occur in the reception apparatus 200 (step S102).

When no process delay would occur (step S102: NO), the image generator 232 in the controller 202 converts, every time the image signal is input from the imager 214, this image signal into digital data to generate (acquire) a frame in a real-time manner, and the display controller 236 controls the display 207 to display an image corresponding to the frame (step S103).

Next, the decoder 234 determines a location (change area: light source) where a hue change occurs due to a change in wavelength in the frames sequentially input in time-series (step S104). Subsequently, the decoder 234 acquires the hue value (type of wavelength) in the change area in the frame, and determines which one of red (R), green (G) or blue (B) the color of the change area corresponding to that hue value is (step S105). In addition, the decoder 234 decodes the bit data stream corresponding to each color that is red (R), green (G), or blue (B), and acquires the communication-target information (step S106). Thereafter, the display controller 236 controls the display 207 to display an image represented by the communication-target information.

Conversely, when a process delay would occur (step S102: YES), the image generator 232 generates (acquires), every time the image signal is input from the imager 214, the frame, and the decoder 234 temporarily stores this frame in the memory 204 while the control on the display 207 to display the image corresponding to the frame is maintained (step S108). Next, the decoder 234 determines whether or not the number of stored frames is repeated by what corresponds to a predetermined length (the length of single optical signal or that of N (where N is a natural number) number of optical signals) (step S109). When the decoder 234 determines that the number of stored frames is not repeated by the predetermined length (step S109: No), the process returns to the step S108 again. Conversely, when the decoder 234 determines that the number of stored frames is repeated by the predetermined length (step S109: YES), the decoder 234 stops the storing process of the frame in the memory 204 at this time point, and executes the processes subsequent to the step S104. Still further, the display controller 236 controls the display 207 to display the image represented by the communication-target information.

As explained above, according to the optical communication system 1 of this embodiment, when necessary process times for the acquisition of frame, the determination on change area, the determination on the color of change area, and the decoding of bit data stream exceed the time t1, and a process delay would occur, the image generator 232 acquires the frame. In addition, the decoder 234 temporarily stores this frame in the memory 204, and performs the determination on change area, the determination on the color of change area, and the decoding of bit data stream at subsequent predetermined timings. Hence, an occurrence of a process delay that causes a part of bit data stream to be lost, resulting in an inaccurate acquisition of the communication-target information accurately is prevented.

Note that the present disclosure is not limited to the foregoing embodiment, and various changes and modifications can be made thereto. For example, in the foregoing embodiment, although the explanation was given of an example case in which red (R), green (G), and blue (B) lights that are visible lights are applied for the optical communication, visible lights with other colors are also applicable, and light other than visible light like infrared ray is applicable.

In addition, the transmitter 114 in the transmission apparatus 100 may be a part of, for example, the display.

Still further, the reception apparatus 200 is not limited to any particular apparatus as long as such an apparatus is capable of imaging, and the imager 214 may pick up only an image of the transmitter 114 of the transmission apparatus 100, and may scan the picked up image. According to this operation, a process delay and an increase in the total amount of data which is frames to be recorded become further preventable. For example, the reception apparatus 200 may be a Personal Handy-phone System (PHS), a Personal Digital Assistance or personal Data Assistance (PDA), a tablet Personal Computer (PC), a gaming apparatus, a portable music player, and the like.

Yet still further, a device that has both of the function of the reception apparatus 200 and the function of the transmission apparatus 100 may be prepared, and both the functions may be utilized individually in accordance with a situation, The program executed in the foregoing embodiment may be distributed in a manner stored in a non-transitory computer readable recording medium, such as a flexible disk, a Compact Disk Read-Only Memory (CD-ROM), a Digital Versatile Disk (DVD), or a Magneto-Optical disk (MO), and may be installed to construct a system that executes the above processes.

The program may be stored in a disk device, or the like of a predetermined server on a network like the Internet, and may be downloaded in a manner, for example, superimposed on carrier waves.

When the above functions are realized in a manner shared by an Operating System (OS) or are realized by the cooperative operations of the OS and an application program, only portions other than the OS may be distributed in a manner stored in a medium, and may be, for example, downloaded.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A decoding apparatus comprising:
   an acquiring unit configured to continuously acquire images that contain visible lights changing in time-series;
   a decoding unit configured to sequentially decode information from the visible lights contained in the images continuously acquired by the acquiring unit;
   a record controlling unit configured to continuously record, in a memory, the images acquired by the acquiring unit; and
   a controlling unit configured to control the decoding unit so that: the decoding unit sequentially decodes information from the visible lights contained in the images stored in the memory by the record controlling unit when there occurs delay in a process of acquiring the images by the acquiring unit or delay in a process of decoding the information by the decoding unit; and the decoding unit sequentially decodes the information from the visible lights contained in the images acquired by the acquiring unit without storing these images in the memory by the record controlling unit when there occurs neither delay in the process of acquiring the images by the acquiring unit nor delay in the process of decoding the information by the decoding unit.

2. The decoding apparatus according to claim 1, wherein:
   the change in time-series occurs cyclically; and
   the record controlling unit is configured to record, in the memory, the images corresponding to at least a cycle of the cyclical change.

3. The decoding apparatus according to claim 1, further comprising a capability recording unit configured to record a capability comprising at least one of the acquiring speed capability of the acquiring unit and the decoding capability of the decoding unit, wherein
   the controlling unit is configured to determine whether or not there occurs delay in acquisition of the images by the acquisition unit or in decoding of the information by the decoding unit, based on the capability stored in the capability recording unit.

4. The decoding apparatus according to claim 3, wherein:
   the capability recording unit stores at least either an acquiring speed of the acquiring unit or a process speed of the decoding unit; and
   when the record controlling unit, based on the acquiring speed of the acquiring unit or the process speed of the decoding unit, determines that a delay has occurred in processing, the record controlling unit continuously stores in the memory the image acquired by the acquiring unit.

5. A decoding method comprising:
   an acquiring step of continuously acquiring images that contain visible lights changing in time-series;
   a decoding step of sequentially decoding information from the visible lights contained in the images continuously acquired in the acquiring step;
   a record controlling step of continuously recording, in a memory, the images acquired in the acquiring step; and
   a controlling step of controlling the decoding step so that: information from the visible lights contained in the images stored in the memory in the record controlling step is sequentially decoded when there occurs delay in a process of acquiring the images in the acquiring step or delay in a process of decoding the information in the decoding step; and the information from the visible lights contained in the images acquired in the acquiring step is sequentially decoded without storing these images in the memory in the record controlling step when there occurs neither delay in the process of acquiring the images in the acquiring step nor delay in the process of decoding the information in the decoding step.

6. The decoding method according to claim 5, wherein:
   the change in time-series occurs cyclically; and
   in the record controlling step, the images corresponding to at least a cycle of the cyclical change are stored in the memory.

7. The decoding method according to claim 5, wherein:
in the controlling step, it is determined whether there occurs delay in a process or not based on at least either a preset acquiring capability in the acquiring step or a preset decoding capability in the decoding step.

8. The decoding method according to claim 7, wherein:
at least either an acquiring speed in the acquiring step or a process speed of the decoding step is set as the preset capability; and
in the controlling step, when determination is made that that a delay occurs in processing based on the acquiring speed of the acquiring step or the process speed by the decoding step, the images acquired in the acquiring step are recorded continuously in the memory.

9. A non-transitory computer readable recording medium having stored therein a program that causes a computer to function as:
an acquiring unit configured to continuously acquire images that contain visible lights changing in time-series;
a decoding unit configured to sequentially decode information from the visible lights contained in the images continuously acquired by the acquiring unit;
a record controlling unit configured to continuously record, in a memory, the images acquired by the acquiring unit; and
a controlling unit configured to control the decoding unit so that: the decoding unit sequentially decodes information from the visible lights contained in the images stored in the memory by the record controlling unit when there occurs delay in a process of acquiring the images by the acquiring unit or delay in a process of decoding the information by the decoding unit; and the decoding unit sequentially decodes the information from the visible lights contained in the images acquired by the acquiring unit without storing these images in the memory by the record controlling unit when there occurs neither delay in the process of acquiring the images by the acquiring unit nor delay in the process of decoding the information by the decoding unit.

10. The non-transitory recording medium according to claim 9, wherein:
the change in time-series occurs cyclically; and
the record controlling unit is configured to record, in the memory, the images corresponding to at least a cycle of the cyclical change.

* * * * *